(12) United States Patent
Mimura

(10) Patent No.: US 7,938,549 B2
(45) Date of Patent: May 10, 2011

(54) RETROREFLECTIVE ARTICLE

(75) Inventor: Ikuo Mimura, Uozu (JP)

(73) Assignee: Nippon Carbide Industries Co., Inc., Tokyo (JP)

( * ) Notice: Subject to any disclaimer, the term of this patent is extended or adjusted under 35 U.S.C. 154(b) by 90 days.

(21) Appl. No.: 12/094,801

(22) PCT Filed: Nov. 30, 2006

(86) PCT No.: PCT/JP2006/324395
§ 371 (c)(1),
(2), (4) Date: Aug. 1, 2008

(87) PCT Pub. No.: WO2007/064033
PCT Pub. Date: Jun. 7, 2006

(65) Prior Publication Data
US 2009/0161217 A1    Jun. 25, 2009

(30) Foreign Application Priority Data

Nov. 30, 2005 (JP) ................................. 2005-345479

(51) Int. Cl.
G02B 5/124 (2006.01)
(52) U.S. Cl. ....................................... 359/530; 428/167
(58) Field of Classification Search .......... 395/529–530; 428/167
See application file for complete search history.

(56) References Cited

U.S. PATENT DOCUMENTS

| | | |
|---|---|---|
| 2,265,790 A | 12/1941 | Young |
| 2,310,790 A | 2/1943 | Jungersen |
| 3,039,093 A | 1/1962 | Rockwood |
| 3,365,790 A | 1/1968 | Brauer |
| 4,588,258 A | 5/1986 | Hoopman |
| 4,775,219 A | 10/1988 | Appeldorn et al. |
| 5,022,739 A | 6/1991 | Bennett et al. |
| 5,132,841 A | 7/1992 | Bennett et al. |
| 5,138,488 A | 8/1992 | Szczech |
| 5,171,624 A | 12/1992 | Walter |
| 5,175,645 A | 12/1992 | Bennett et al. |
| 5,565,151 A | 10/1996 | Nilsen |
| 5,706,132 A | 1/1998 | Nestegard et al. |
| 5,898,523 A | 4/1999 | Smith et al. |
| 5,936,770 A | 8/1999 | Nestegard et al. |
| 6,036,322 A | 3/2000 | Nilsen et al. |
| 6,685,323 B1 | 2/2004 | Mimura et al. |
| 6,883,921 B2 | 4/2005 | Mimura et al. |
| 2007/0109641 A1 | 5/2007 | Mimura et al. |
| 2009/0122405 A1* | 5/2009 | Mimura ........................ 359/530 |

FOREIGN PATENT DOCUMENTS

| | | |
|---|---|---|
| EP | 0 137 736 | 10/1992 |
| EP | 0 548 280 | 9/1994 |
| JP | 11-149009 | 6/1999 |
| WO | 03/014779 | 2/2003 |
| WO | 2005/054909 | 6/2005 |

* cited by examiner

*Primary Examiner* — James Phan
(74) *Attorney, Agent, or Firm* — Fitzpatrick, Cella, Harper & Scinto

(57) ABSTRACT

A retroreflective article with excellent wide-angle characteristics is provided. Entrance angle characteristics, observation angle characteristics, and rotation angle characteristics are improved. In a retroreflective article, an assembly of multidirectional retroreflective elements is formed, in which either five, or seven or more unit elements are formed so as to share two common base edges forming the triangular base face of the unit elements and a common vertex at which the common base edges intersect, with an adjacent retroreflective element.

15 Claims, 14 Drawing Sheets

Prior Art

RETROREFLECTIVE ARTICLE

TECHNICAL FIELD

This invention relates to a retroreflective article which is optimal for use in traffic signs and commercial signs.

Specifically, the invention relates to a retroreflective article which comprises a multidirectional retroreflective element (multidirectional element) assembly having numerous triangular-pyramidal cube-corner retroreflective elements formed therein, and which exhibits excellent retroreflection performance at nighttime.

More specifically, the invention relates to a retroreflective article having excellent wide-angle performance, and having improved entrance angle characteristics, observation angle characteristics, and in particular excellent rotation angle characteristics.

BACKGROUND ART

In the prior art, there have been a number of proposals of retroreflective articles having excellent wide-angle performance, with improved entrance angle characteristics, observation angle characteristics, and rotation angle characteristics.

With respect to improvement of the entrance angle characteristics or observation angle characteristics of such cube-corner type retroreflective sheets and retroreflective articles, and in particular of triangular-pyramidal cube-corner retroreflective sheets and retroreflective articles, various proposals have been made from long ago, and various improvements have been studied. Many of these technologies improve the entrance angle characteristics by inclining the optical axes of some of the retroreflective elements.

For example, in U.S. Pat. No. 2,310,790 by Jungersen, an arrangement of retroreflective elements in various shapes on a thin sheet is described. The triangular-pyramidal reflective elements given as examples in this U.S. Patent include regular-triangular triangular-pyramidal reflective elements, the vertices of which are positioned at the centers of the base triangles, and which have no inclination of the optical axis, as well as isosceles-triangular triangular-pyramidal elements, the vertices of which are not positioned at the centers of the base triangles, and it is stated that light is caused to be reflected effectively (entrance angle characteristics are improved) for approaching vehicles.

Further, it is stated as the size that the depth of the triangular-pyramidal reflecting elements is within 1/10 inch (2,540 μm). And, in FIG. 15 of this U.S. Patent, a triangular-pyramidal reflecting element pair is shown the optical axis of which is inclined in the positive (+) direction; the angle of inclination (θ) of this optical axis, determined from the ratio of the long edges to the short edge in the base isosceles triangle of the triangular-pyramidal reflecting elements shown in the figure, is estimated to be approximately 6.5°.

Further, in European Patent No. 137,736B1 by Hoopman, a retroreflective sheet and retroreflective article are described in which pairs of inclined triangular-pyramidal cube-corner retroreflective elements, the triangular shapes in the base plane on a thin sheet of which are isosceles triangles, rotated 180° with respect to each other, are arranged with base faces on a common surface in closest-packed fashion. The optical axis of the triangular-pyramidal cube-corner retroreflective elements described in this patent are inclined in what is the negative (−) direction in this Specification, and the angle of inclination is shown to be approximately 7° to 13°.

Further, in U.S. Pat. No. 5,138,488 by Szczech, a retroreflective sheet and retroreflective article are disclosed, in which inclined triangular-pyramidal cube-corner retroreflective elements, the triangular shape in the base plane on a thin sheet of which are isosceles triangles, are similarly arranged with base faces on a common surface in closest-packed fashion. In this U.S. Patent, the optical axis of the triangular-pyramidal reflective elements is inclined in the direction common to two triangular-pyramidal reflective elements facing each other and forming a pair, that is, in the positive (+) direction explained below, the inclination angle is approximately 2° to 5°, and the element size is stipulated to be from 25 μm to 100 μm.

Further, in European Patent No. 548,280B1 corresponding to the above patent, it is stated that the direction of inclination of the optical axis comprises the common edge of two elements forming a pair, and that the distance of the vertex of an element and the plane perpendicular to the common plane is equal to the distance between the point at which the element optical axis intersects the common plane and the perpendicular plane, and that the inclination angle is approximately 2° to 5°, and the element size is 25 μm to 100 μm.

In this way, in the European Patent No. 548,280B1 of Szczech, the optical axis is in a range from approximately 2° to 5°, comprising both positive (+) and negative (−) directions. However, in the embodiments of the above U.S. Patent and European Patent of Szczech, only triangular-pyramidal reflective elements having an optical axis inclination angle of (−)8.20, (−)9.2°, and (−)4.3°, and with an element height (h) of 87.5 μm, are disclosed.

In addition, various proposals have been made relating to improvement of observation angle characteristics.

In U.S. Pat. No. 4,775,219 of Appeldorn, V-shape grooves forming elements present an asymmetrical shape such as shown in FIG. 17 which explains the present invention, and have a slight deviation with respect to the angle of the theoretical V-shape grooves forming cube corners. Further, by periodically modifying the deviation which imparts asymmetry to adjacent V-shape grooves, an attempt is made to improve observation angle characteristics.

However, periodic modification of the angle of adjacent V-shape grooves increases the difficulty of die machining. Even if this difficulty could be overcome, the combination of deviations which could be imparted is limited, and a uniform reflected light spreading could not be imparted. Further, it has been necessary to prepare several types of diamond bits to form V-shape grooves and other machining tools for one V-shape groove direction. And, high-precision machining technology has also been necessary when forming asymmetric V-shape grooves.

Further, in U.S. Pat. No. 5,171,624 by Walter, a triangular-pyramidal retroreflective element is disclosed, the reflective faces of which are formed using a machining tool having a curve-shape cross-sectional shape, having a fixed quadratic surface cross-sectional shape. In a triangular-pyramidal retroreflective element in which reflective side faces having a quadratic surface are formed, appropriate dispersion of retroreflective light is possible, and improvement of observation angle characteristics is obtained.

However, it is extremely difficult to fabricate machining tools having such curved-surface cross-sectional shapes by design. Hence due to the difficulty of machining such tools, it has been very difficult in the past to obtain quadratic surfaces by design. And, it has not been possible to form quadratic surfaces in various shapes, determined only by the shapes of machining tools used, on the same retroreflective article in given surface shapes.

In U.S. Pat. No. 5,565,151 by Nilsen, a portion of a reflecting side face (A-B-H) is cut away, and an attempt is made to promote the dispersion of retroreflective light and improve observation angle characteristics by means of the triangular-columnar shapes (A-A1-A2-B2-B1-B) formed thereby and the new reflecting side faces (A2-H1-B2).

However, in the invention of Nilsen there is no description of the kind of triangular columnar shape which is preferable for installation, nor of the kind of angle at which new reflecting side faces are to be formed. Further, special tools are required to cut away a portion of reflecting side faces and form a portion of the triangular columnar shape. And, elements with the newly formed triangular columnar shape do not have retroreflection functions, but are simply designed to obtain spreading of retroreflective light through dispersion of light in various directions.

However, in the above-described technology to improve entrance angle characteristics and observation angle characteristics, there is no attainment of improved rotation angle characteristics.

Various proposals relating to improvement of rotation angle characteristics have been made; in all such proposals, an attempt is made to improve rotation angle characteristics by partitioning the directions of retroreflective elements, the base faces of which have triangular shapes, into various regions and combining regions.

Examples include U.S. Pat. No. 5,022,739, U.S. Pat. No. 5,132,841, and U.S. Pat. No. 5,175,645, by Bennett et al; U.S. Pat. No. 6,036,322, by Nilsen et al; U.S. Pat. No. 5,706,132 and U.S. Pat. No. 5,936,770, by Nestegard et al; and U.S. Pat. No. 5,898,523, by Smith.

However, although the shapes into which element regions are partitioned and the directions of triangular-pyramidal cube-corner elements are different, all of the technologies of these patents can be said to employ the same basic technique.

DISCLOSURE OF THE INVENTION

An object of this invention is the provision of a retroreflective article having excellent wide-angle characteristics, and improvement of entrance angle characteristics, observation angle characteristics, and rotation angle characteristics.

In particular, an object is to provide a retroreflective article having excellent rotation angle characteristics, as well as a retroreflective article provided with excellent entrance angle characteristics and observation angle characteristics.

A further object is to provide a retroreflective sheet, which can be used in such specific applications as traffic signs, construction signs, commercial signs, vehicle license plates, and similar, and which can be cut freely in any direction and utilized due to excellent rotation angle characteristics.

This invention provides a triangular-pyramidal cube-corner retroreflective article, comprising numerous triangular-pyramidal cube-corner retroreflective elements formed by cutting away a group of grooves having a substantially V-shape cross-section, and is characterized in that an assembly of multidirectional retroreflective elements (hereafter called "multidirectional elements") is formed, in which either five, or seven or more triangular-pyramidal cube-corner retroreflective elements (hereafter called "unit elements") are formed so as to share two base edges (hereafter called "common base edges") forming triangular base faces of the unit elements as well as vertexes (hereafter called "common vertexes") at which the common base edges intersect, with an adjacent retroreflective element.

In this invention, a multidirectional element is formed by combining triangular-pyramidal cube-corner elements having optical axes direction in various directions, so that the multidirectional element exhibits excellent retroreflective efficiency regardless of the direction from which light is incident. Further, in practical terms, excellent retroreflective efficiency is obtained regardless of the rotation angle (meaning the direction of either the retroreflective article, or the retroreflective sheet) at which a retroreflective article of this invention is installed.

Further, a multidirectional element in which unit elements are combined in various directions also exhibits excellent entrance angle characteristics. In particular, a unit element used in this invention has a shape in which the optical axis is inclined, so that entrance angle characteristics are also improved.

It is preferable that a multidirectional element of this invention be formed from five or seven to twelve unit elements. If four or fewer unit elements are used, the unit elements cannot form a cube-corner shape, and a combination of six unit elements is equal to a reflective element group comprising triangular-pyramidal cube-corner reflecting elements of the prior art.

Further, combinations of multidirectional elements in which 13 or more unit elements are combined exist, but the ratio of the lengths of common edges and outer peripheral base edges becomes too great. Hence the ratio of the area of reflecting side faces having common base edges to the area of reflecting side faces having outer peripheral base edges becomes too great, so that the retroreflective efficiency declines, which is not preferable.

Further, in the case of combinations in which the number of unit elements is an odd number, by forming a retroreflective article in which multidirectional elements are combined by combining a multidirectional element with the multidirectional element rotated by 180°, a combination is obtained in which the number of unit elements is twice as great, and rotation angle characteristics are made still more uniform.

Further, in the case of combinations in which the number of unit elements is an even number, die formation is facilitated, which is preferable.

Further, retroreflective articles in which two or more types of multidirectional elements are combined are also possible. By combining a plurality of multidirectional elements in this way, rotation angle characteristics can be further improved.

In this invention, it is preferable that the lengths of two common base edges forming a unit element be equal. The shape of the base face of such a unit element is an isosceles triangle, and the shape of a multidirectional element thus formed has an external periphery in the shape of a regular polygon. A retroreflective article which combines multidirectional elements having an external periphery with such a regular polygonal shape has a higher closest-packing density of multidirectional elements, and so the retroreflective efficiency can be improved.

In a method of forming a multidirectional element in this invention, the multidirectional element can be formed such that the locus of base portions defined by the intersection of two side faces of grooves having a substantially symmetrical V-shape cross-section forms straight lines, bent lines, curves and repeated line groups comprising combinations of these line groups.

In this invention, in a groove with a substantially symmetrical V-shape, the angle of the V-shape groove can be determined such that the three side faces of a triangular-pyramidal shape remaining when the V-shape groove is cut out are mutually perpendicular. Further, a slight inclination can be imparted to mutually perpendicular side faces to improve the observation angle characteristics as well. Consequently, a slight inclination can be imparted to the angle of the V-shape groove from the angle of perpendicular formation, and asymmetrical V-shape grooves can be used as well.

V-shape grooves are formed continuously, and the locus of the base portion defined by the intersection of the two side faces of the V-shape grooves is formed continuously. The locus of the base portion describes a straight line or a bent line in order to form a multidirectional element. Further, in order to improve the observation angle characteristics, the loci can be bent lines, curves, or combinations of these lines obtained by imparting slight modifications to the base edges of the original straight lines. It is preferable that the nonlinearity be such that the deviation from straight lines is, for example, approximately 5 to 1000 nm/μm.

Further, by making the line group forming the locus of the base portions curve groups defined by trigonometric functions, inverse trigonometric functions, elliptic functions, circular functions, and composite functions of these functions, the observation angle characteristics can be improved.

It is preferable that the nonlinearity be such that the deviation of these curves from straight lines is, for example, approximately 5 to 1000 nm/μm.

In this invention, bent lines are formed by substantially combining straight lines; but it is preferable that bending portions be curves the radius of curvature of which is 2 to 20 μm. If the radius of a bending portion is too large, exceeding 20 μm, then a ridgeline of a unit element may be cut away and reflection efficiency may decline, or other problems readily occur. Further, if the radius is less than 2 μm, then an excessive load is applied to the cutting tool, and tool breakage or wear, or other problems readily occur, which is not preferable.

Numerous line groups comprising straight lines, bent lines, curves, and combinations of these line groups, to form a retroreflective article of this invention in which numerous multidirectional elements are formed, are formed through repeated patterns at an equal pitch.

Further, repeated line groups which form the locus of base portions of the above V-shape grooves are in a common plane, defined by the triangular base faces of unit elements.

Moreover, in order to improve the retroreflective efficiency, positioning is also possible such that at least one line group of the repeated line groups is not in the common plane. For example, among the repeated line groups forming the outer-periphery base edges of unit elements in a pentagonal multidirectional element, by making the repeated line group forming the common base edges more shallow, the areas of the three reflecting side faces of unit elements can be made equal.

Further, in the case of a multidirectional element in the shape of a heptagon or higher-order polygon, by making the repeated line group forming the shared base edges deeper than the repeated line groups forming the outer-peripheral base edges of the unit elements, the areas of the three reflecting side faces of unit elements can be made equal.

That is, by forming at least one line group among the repeated line groups so as not to be in the common plane, but such that the depth of the V-shape groove, determined by the distance between a plane defined by the line group and the vertex of the unit element, is ±(5 to 200) % of the element height defined by the distance between the vertex of the unit element and the common plane, and still more preferably is ±(5 to 40) %, the retroreflective efficiency can be increased.

Further, in order to improve the retroreflective efficiency, it is preferable that in the three base edges of the triangular base face of a unit element, when the depth of the V-shape groove forming the shortest base edge is assumed as ds, and the depth of the V-shape groove forming the longest base edge is assumed as de, an inequality $1.05 \leq (ds/de) \leq 3.00$ (1) be satisfied, and still more preferable that an inequality $1.05 \leq (ds/de) \leq 1.40$ (2) be satisfied.

In order to improve the observation angle characteristics, it is preferable that the multidirectional elements be formed comprising at least one type of unit element having a prism side face in which at least one prism apex angle among three prism apex angles formed by three reflecting side faces forming the unit element and perpendicular to one another has a deviation from perpendicular of from 0.0001 to 0.01°.

It is still more preferable that the multidirectional elements be formed comprising at least one type of unit element having a prism side face in which at least one prism apex angle among three prism apex angles formed by three reflecting side faces forming the unit element and perpendicular to one another has a deviation from perpendicular of from 0.0001 to 0.01°.

Further, in order to improve the observation angle characteristics, it is preferable that at least one reflecting side face of the three retroreflective side faces of the unit element forms a curved surface, and that the maximum deviation of the curved surface from a virtual plane for which the unit element forms a theoretical cube-corner element is from $1/1000$ to $200/1000$ of the length of the base portion forming the curved surface.

By imparting a slight deviation to the prism apex angles of unit elements by the various methods described above, the retroreflective light spreading can be increased, and observation angle characteristics can be improved. The degree of deviation can be selected appropriately according to the observation angle for which improvement is desired.

Further, in the case of a multidirectional element formed from seven or more unit elements, because the optical axis inclination is large, in order to improve the retroreflective efficiency, it is preferable that V-shape grooves forming common base edges be cut by means of one or more V-shape subgrooves, parallel to the V-shape grooves forming base edges of unit elements forming the outer periphery of the multidirectional element, and having an angle substantially equal to the angle of the V-shape grooves, and that unit reflective elements be formed by a square-shape cube-corner retroreflective element with at least one base face and by one triangular-pyramidal cube-corner retroreflective element.

Further, in cases in which retroreflective articles of this element are used as sheet-shape products, it is preferable that the height of the unit elements be from 25 to 2000 μm, in order to obtain flexibility of the sheet product. If the height is less than 25 μm, elements are small, so that spreading of retroreflective light due to diffraction effects becomes excessive, which is not preferable; if the height exceeds 2000 μm, sheet flexibility is not obtained, which is not preferable.

Any material which has excellent light transparency and a high refractive index can be used as optical media of a retroreflective element of this invention, and no limits in particular are imposed. For example, glass materials, transparent resins, and similar can be used preferable. As transparent resins, acrylic resins, polycarbonate resins, vinyl chloride resins, styrene resins, epoxy resins, urethane resins, and copolymer resins, modified resins, combinations and similar of these resins, can be used. Retroreflective articles formed from resins have excellent flexibility, are lightweight, are colorable, and have other excellent properties, and are preferable.

Further, by adding coloring agents, ultraviolet ray absorption agents, light stabilizers, oxidation inhibitors, and similar as appropriate to such transparent resins, excellent coloring, durability, weather resistance, and other properties can be imparted. These properties can also be attained by laminating retroreflective articles onto other resin layers, or by other methods.

Further, in order to attain reflection by the principle of total internal reflection in a retroreflective article of this invention, an air layer can be provided in the back face of retroreflective elements, to adopt a sealed structure which prevents the intrusion of water, moisture, and similar.

Further, a light-reflecting mirror-surface reflecting layer, such as of aluminum or similar, can be provided on the reflecting faces of retroreflective elements. A retroreflective article provided with such mirror-surface reflecting layers efficiently reflects over a broad range of incidence angles and so is preferable, but has the drawback that the external appearance of the article is dark due to the mirror-surface reflecting layer.

In this way, by means of this invention, retroreflective articles can be provided with improved wide-angle characteristics, that is, with improved entrance angle characteristics, observation angle characteristics, and rotation angle characteristics.

BEST MODE FOR CARRYING OUT THE INVENTION

Preferred modes of multidirectional retroreflective articles of the invention are explained, citing the drawings.

Figure 1:
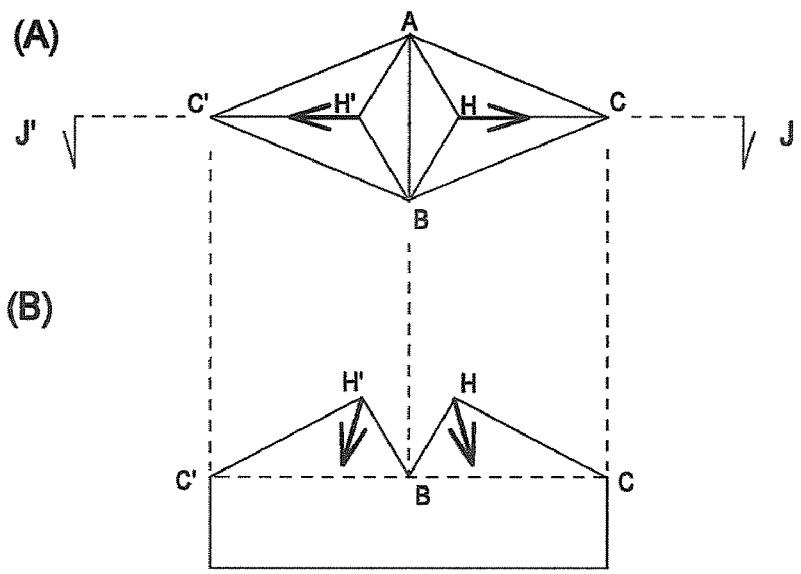
FIG. 1 is a triangular-pyramidal cube-corner element pair of the prior art.

FIG. 1 shows a plane view and cross-sectional view of triangular-pyramidal cube-corner retroreflective elements (A-B-C and A-B-C') of the prior art. These triangular-pyramidal cube-corner retroreflective elements are two elements with left-right symmetry, formed in closest-packing mode with one common base edge (A-B).

In general, the optical axis of an element is inclined for the purpose of improving the entrance angle characteristics; the two optical axes of an element pair are inclined so as to be directed in opposite directions by the same angle. However, the optical axes are inclined only in the plane perpendicular to the common base edge (A-B), and are not inclined in the plane parallel to the common base edge (A-B), so that there is the problem that the entrance angle characteristics are not improved for this direction.

Figure 2:
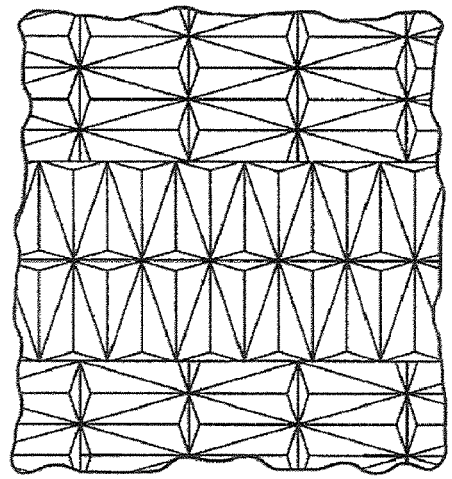
FIG. 2 is a triangular-pyramidal cube-corner element group of the prior art.

On the other hand, regions are partitioned and combined such that the directions of triangular-pyramidal cube corners which form a pair in the element group shown in FIG. 2 are mutually perpendicular. This combination of element groups averages the performance for azimuth angles of 0° and 90°, so that the rotation angle characteristics can be improved; but at azimuth angles other than 0° and 90°, fluctuations in reflection performance remain. At the 45° azimuth angle in particular, the improvement in reflection performance, and in particular in entrance angle characteristics, is unsatisfactory.

Examples of such element forms include U.S. Pat. No. 5,022,739, U.S. Pat. No. 5,132,841, and U.S. Pat. No. 5,175,645, by Bennett et al; U.S. Pat. No. 6,036,322, by Nilsen et al; U.S. Pat. No. 5,706,132 and U.S. Pat. No. 5,936,770, by Nestegard et al; and U.S. Pat. No. 5,898,523, by Smith; in all these cases, improvement of rotation angle characteristics is inadequate.

Figure 3:
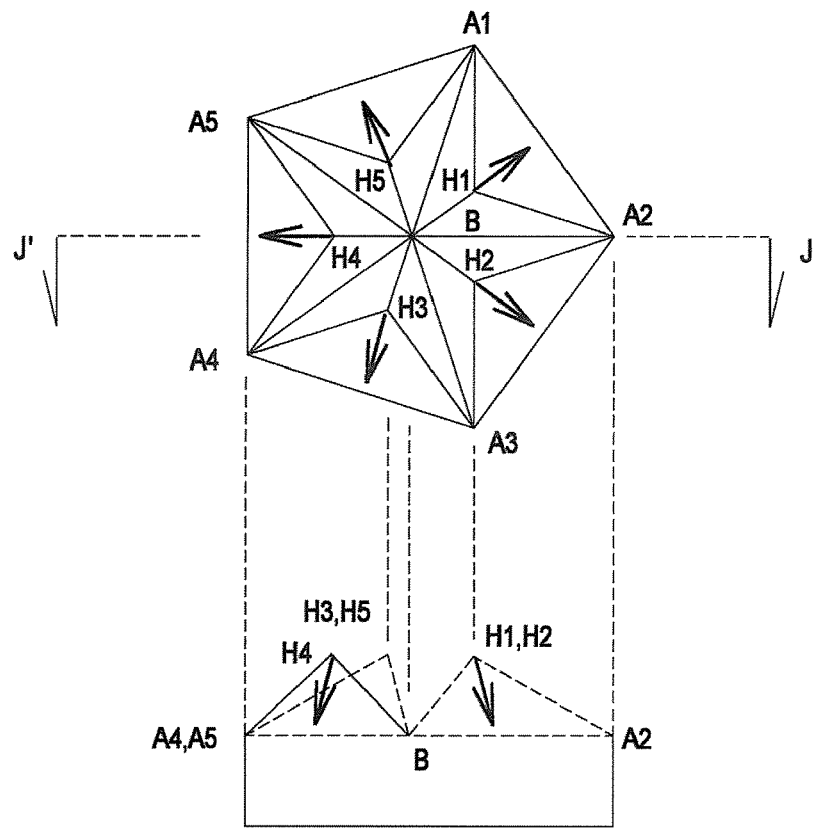
FIG. 3 shows a multidirectional element of the invention.

FIG. 3 shows a plane view and cross-sectional view of a multidirectional element, formed such that five unit elements in this invention each have two base edges (A1-B, A2-B, A3-B, A4-B, and A5-B) and one vertex (B) in common. The arrows shown in FIG. 3 indicate the directions of inclination of the optical axes of elements; because of uniform dispersion in five directions, excellent rotation angle characteristics can be obtained. Further, the inclination angle of the optical axes is 11.333°, and directions are inclined toward the outer-periphery base edges, so that entrance angle characteristics are also improved.

Figure 4:
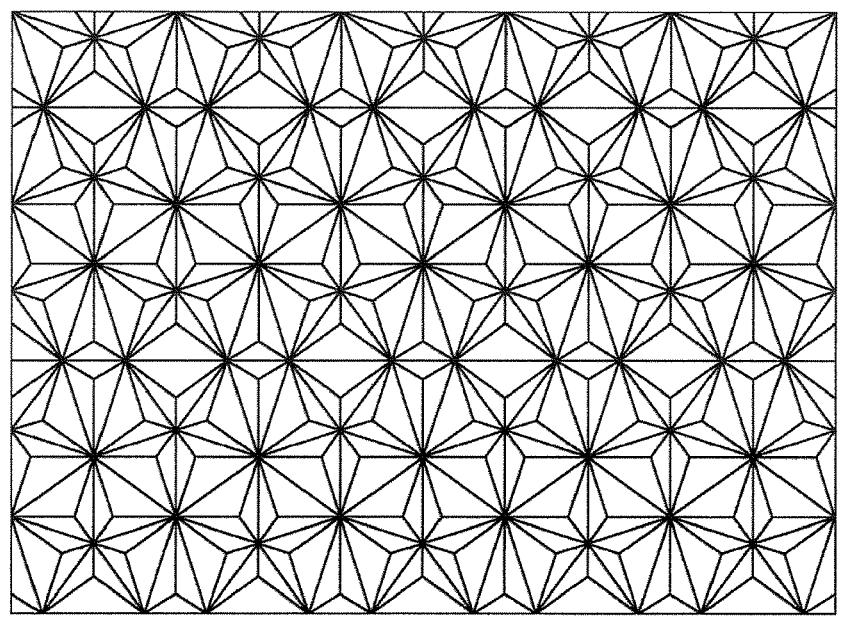
FIG. 4 is a plane view showing a multidirectional element group of the invention.

FIG. 4 is a plane view of a retroreflective article of this invention, in which many of the pentagonal multidirectional elements shown in FIG. 3 are arranged. Elements having a triangular-pyramidal shape are formed between the multidirectional elements; these triangular-pyramidal shapes do not form cube-corner elements, and so do not contribute to retroreflection. The element group which forms the multidirectional retroreflective article shown in FIG. 4 is formed by V-shape groove groups having a continuous bent-line shape bottom portion locus.

Figure 5:
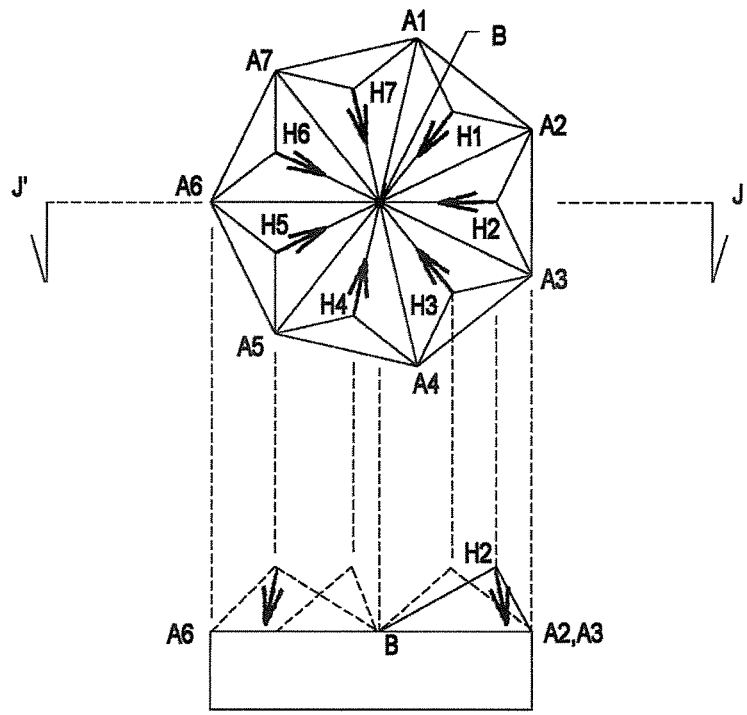
FIG. 5 shows a multidirectional element of the invention.

FIG. 5 shows a plane view and cross-sectional view of a multidirectional element, formed such that seven unit elements of this invention have two base edges (A1-B, A2-B, A3-B, A4-B, A5-B, A6-B, A7-B) and one vertex (B) in common. The optical axes of the unit elements shown in FIG. 5 are inclined, and the directions are dispersed uniformly in seven directions, so that excellent rotation angle characteristics can be obtained. Further, the inclination angle of the optical axes is 6.476°, inclined in the direction of the common vertex (B), so that entrance angle characteristics are also improved.

Figure 6:
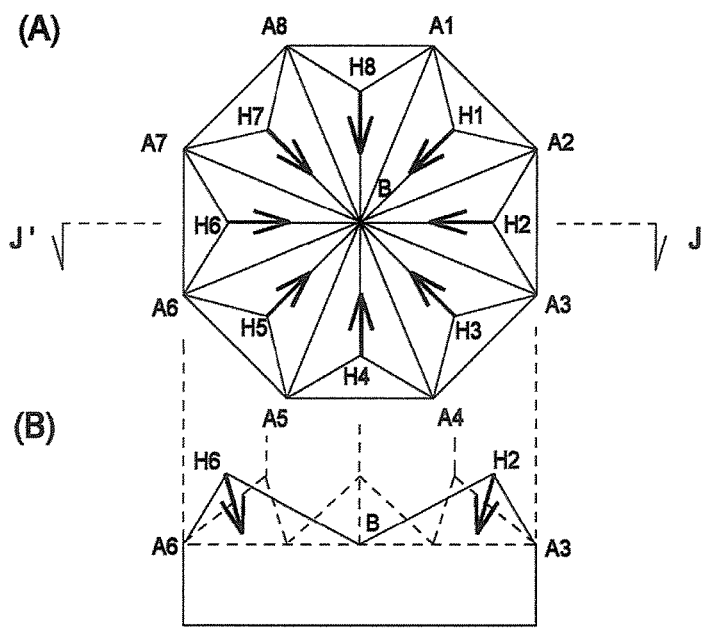
FIG. 6 shows a multidirectional element of the invention.

FIG. 6 shows a plane view and cross-sectional view of a multidirectional element, formed from eight unit elements of this invention having two base edges (A1-B, A2-B, A3-B, A4-B, A5-B, A6-B, A7-B, A8-B) and one vertex (B) in common. The arrows shown in FIG. 6 indicate the direction of inclination of the optical axes of the elements; because the directions are dispersed uniformly in eight directions, excellent rotation angle characteristics are obtained. Further, the angle of inclination of the optical axes is 10.790°, and inclination is in the direction of the common vertex (B), so that the entrance angle characteristics are also improved.

Figure 7:
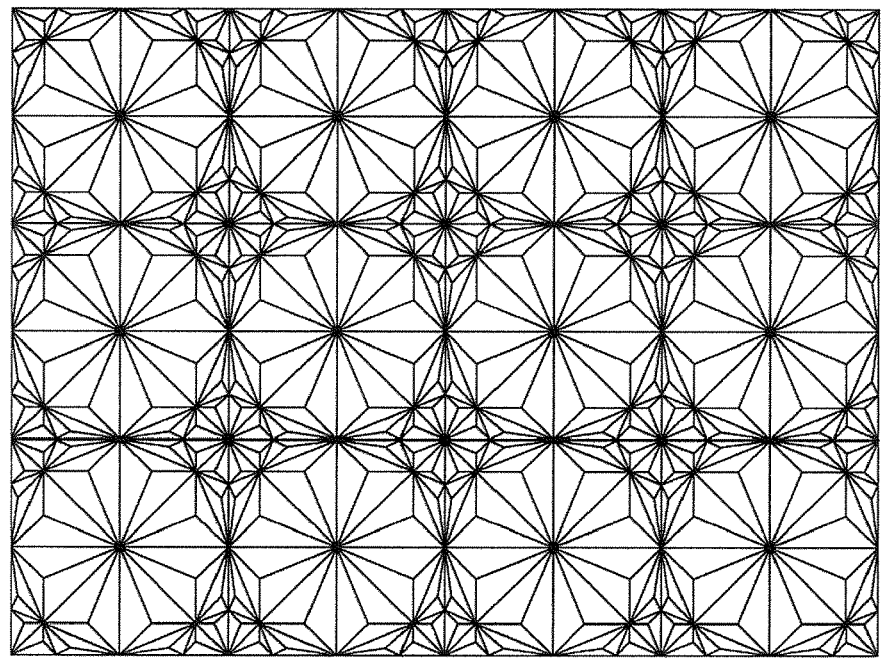
FIG. 7 is a plane view showing a multidirectional element group of the invention.

FIG. 7 shows a plane view of a retroreflective article of this invention, in which many of the octagonal multidirectional elements shown in FIG. 6 are arranged. Elements having a triangular-pyramidal shape are formed between the multidirectional elements, but because triangular-pyramidal cube-corner elements are not formed, these do not contribute to retroreflection. The element group forming the multidirectional retroreflective article shown in FIG. 7 is formed by V-shape grooves having the base portion locus of a continuous bent line shape. Octagonal multidirectional elements with a smaller shape are formed between the octagonal multidirectional elements, so that the packing density of the element group is raised, and the retroreflective efficiency is increased. Further, the observation angle characteristics of the small multidirectional elements are improved through a large diffraction effect.

Figure 8:
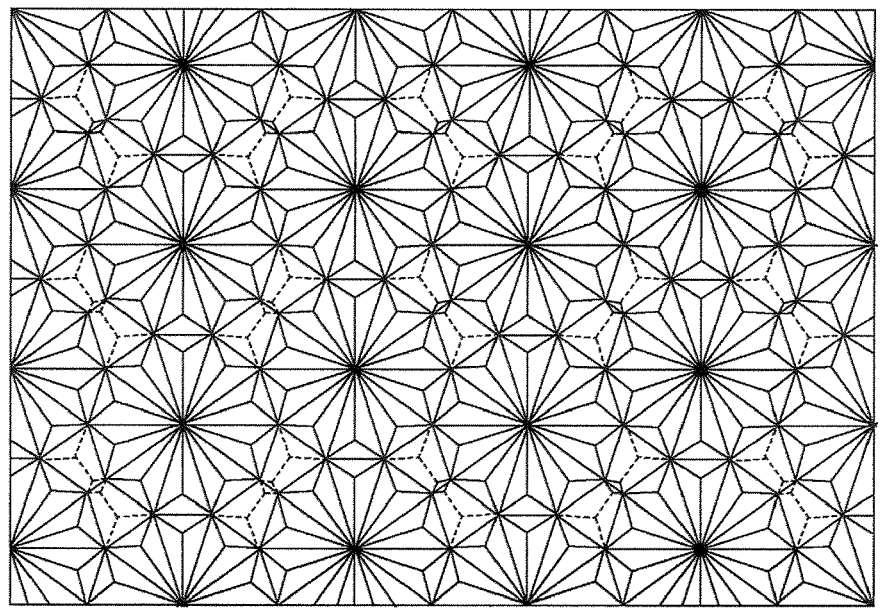
FIG. 8 is a plane view showing a multidirectional element group of the invention.

FIG. 8 shows a plane view of a retroreflective article of this invention, in which numerous decagonal multidirectional elements are arranged. Between the multidirectional elements, elements with a triangular-pyramidal shape, with one vertex cut away, are formed, but these do not form triangular-pyramidal cube-corner elements, and so do not contribute to retroreflection. The element group forming the multidirectional retroreflective article shown in FIG. 8 are formed by a V-shape groove pattern having a base portion locus with a continuous bent-line shape.

Figure 9:
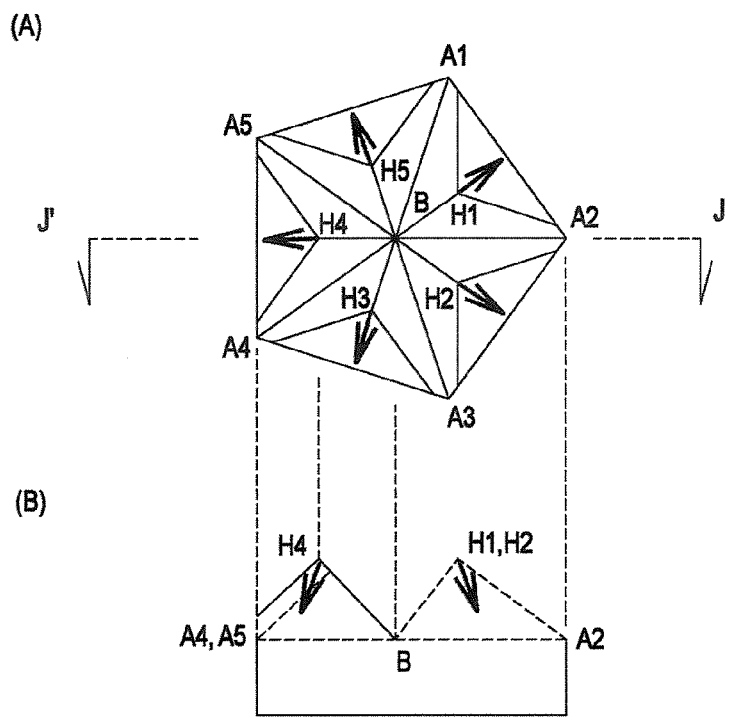
FIG. 9 shows a multidirectional element of the invention.

FIG. 9 shows a plane view and cross-sectional view of a multidirectional element, formed from five unit elements of this invention having two base edges (A1-B, A2-B, A3-B, A4-B, A5-B) and one vertex (B) in common, the outer-periphery base edges of which are formed more shallowly than the common base edges (A1-B, A2-B, A3-B, A4-B, A5-B), and portions of the outer-periphery base edges of which are cut away by common base edges. For this reason, elements are formed such that the areas of the three reflecting side faces of the unit elements are equal, and the retroreflective efficiency is raised.

The optical axes of the unit elements forming the multidirectional element shown in FIG. 9 are dispersed uniformly in five directions, so that excellent rotation angle characteristics can be obtained. Further, the optical axis inclination angle is 11.333°, and inclination is in the directions of the outer-periphery base edges (A1-A2, A2-A3, A3-A4, and A5-A1), so that entrance angle characteristics are also improved.

Figure 10:
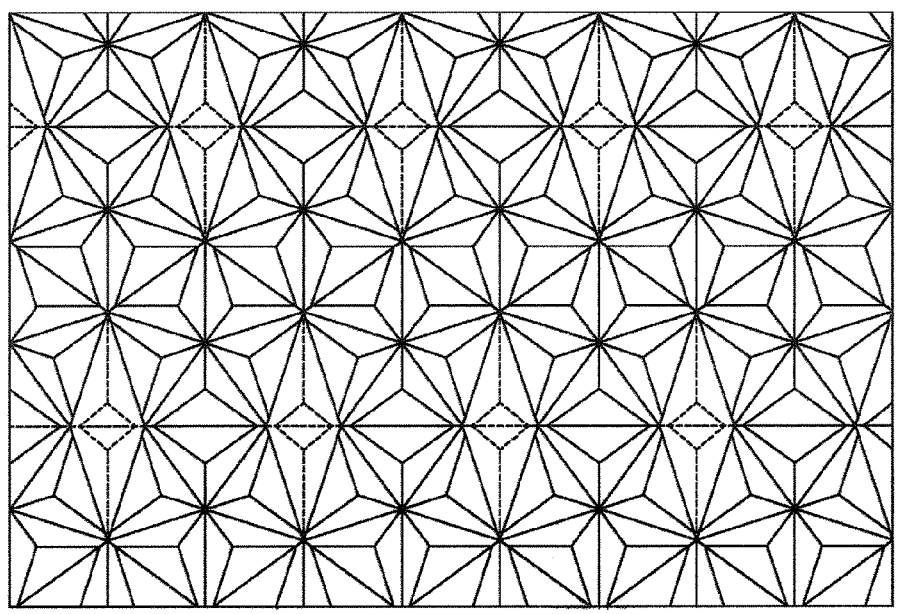
FIG. 10 is a plane view showing a multidirectional element group of the invention.

FIG. 10 shows a plane view of a retroreflective article of this invention, in which many of the shallow-groove type pentagonal multidirectional elements such as shown in FIG. 9 are arranged. Elements having a triangular-pyramidal shape are formed between the multidirectional elements, but these triangular-pyramidal shapes do not form cube-corner elements, and so do not contribute to retroreflection. The element group forming the multidirectional retroreflective article shown in FIG. 10 is formed by a V-shape groove group having a base portion locus with a continuous bent-line shape.

Figure 11:
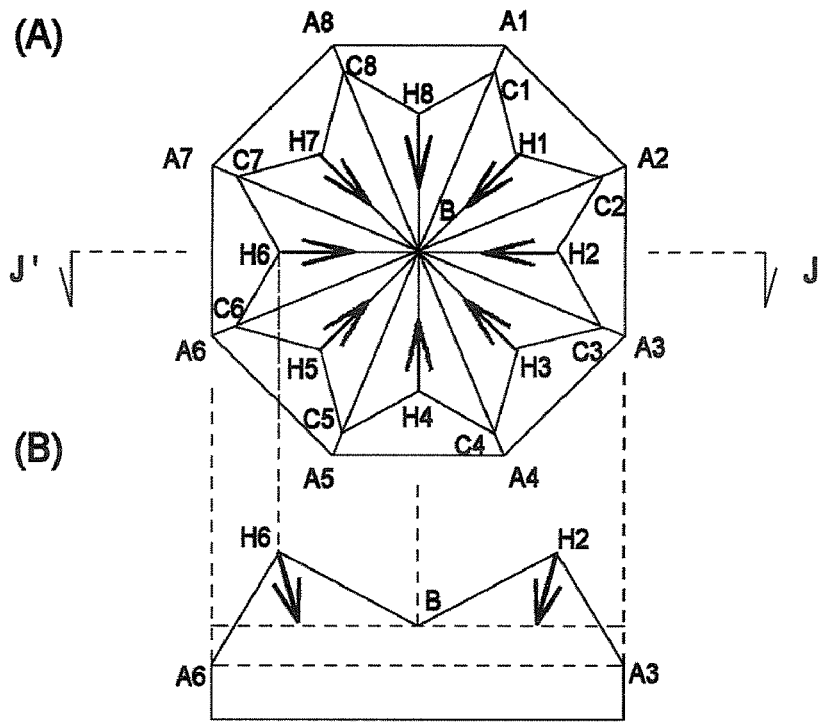
FIG. 11 shows a multidirectional element of the invention.

FIG. 11 shows a plane view and cross-sectional view of a multidirectional element, formed such that eight unit elements have in common two base edges (A1-B, A2-B, A3-B, A4-B, A5-B, A6-B, A7-B, A8-B) and one vertex (B); the outer-periphery base edges (A1-A2, A2-A3, A3-A4, A4-A5, A5-A6, A6-A7, A7-A8, and A8-A1) are formed so as to be deeper than the common base edges (A1-B, A2-B, A3-B, A4-B, A5-B, A6-B, A7-B, A8-B). Hence the unit elements are formed such that the areas of the three reflecting side faces of the unit elements are equal, and the retroreflective efficiency is raised.

Because the optical axes of the unit elements forming the multidirectional element shown in FIG. 11 are dispersed uniformly in eight directions, excellent rotation angle characteristics can be obtained. Further, because the optical axis inclination angle is 10.790°, and inclination is in the direction of the common vertex (B), the entrance angle characteristics are also improved.

Figure 12:
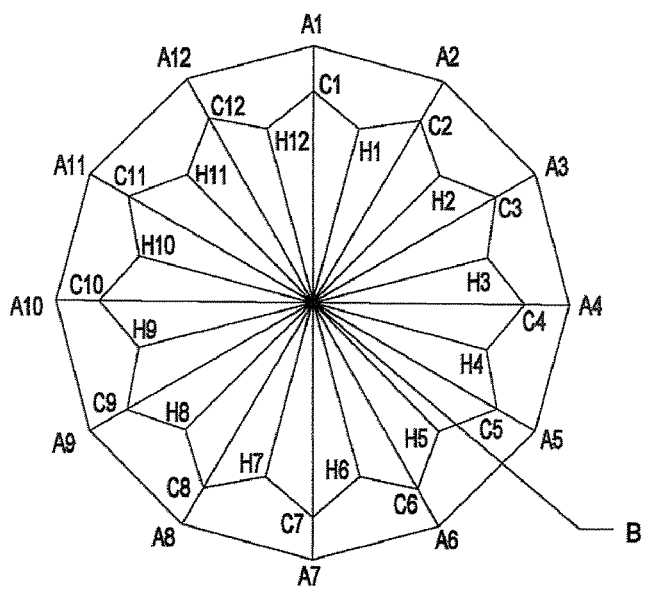
FIG. 12 shows a multidirectional element of the invention.

Because the optical axes of the unit elements forming the multidirectional element shown in FIG. 12 are dispersed uniformly in 12 directions, excellent rotation angle characteristics can be obtained. And, the optical axis inclination angle is 19.720°, and inclination is in the directions of the outer-periphery base edges (A1-A2, A2-A3, A4-A5, A5-A6, A6-A7, A7-A8, A8-A9, A9-A10, A10-A11, A11-A12, A12-A1), the entrance angle characteristics are also improved.

Figure 13:
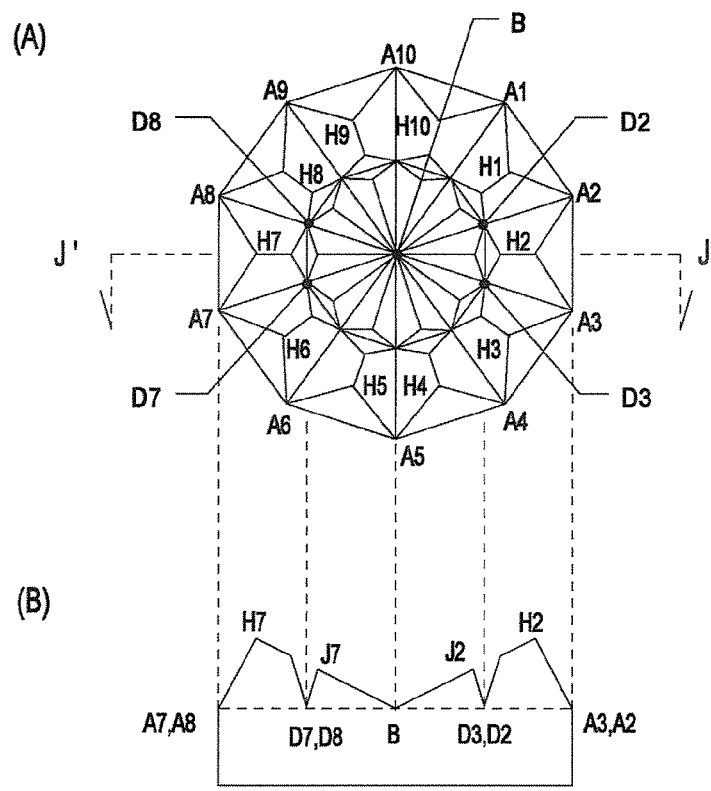
FIG. 13 shows a multidirectional element of the invention.

FIG. 13 shows a multidirectional element in which ten unit elements are combined. In this multidirectional element, V-shape grooves forming common base edges are cut by means of one V-shape subgroove parallel to the V-shape grooves forming the outer-periphery base edges, and having an angle substantially equal to the angle of the V-shape grooves; unit elements are formed by cube-corner retroreflective elements the base face of which is square in shape and triangular-pyramidal cube-corner retroreflective elements. An element in which such a subgroove is formed has higher retroreflective efficiency, and so is particularly preferable.

Figure 14:
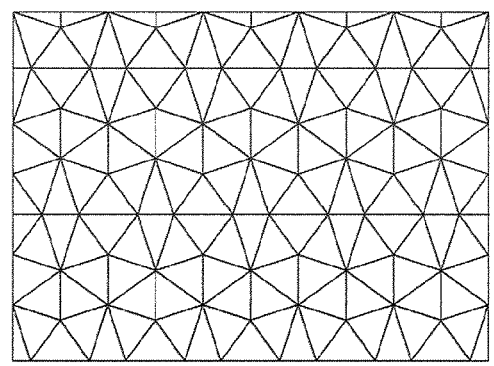
FIG. 14 shows the locus of groove base portions forming multidirectional elements of this invention.
Figure 15:
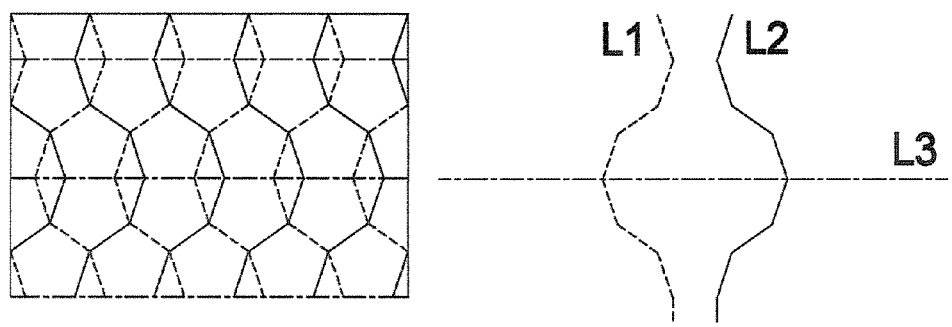
FIG. 15 shows the locus of groove base portions forming multidirectional elements of this invention.
Figure 16:
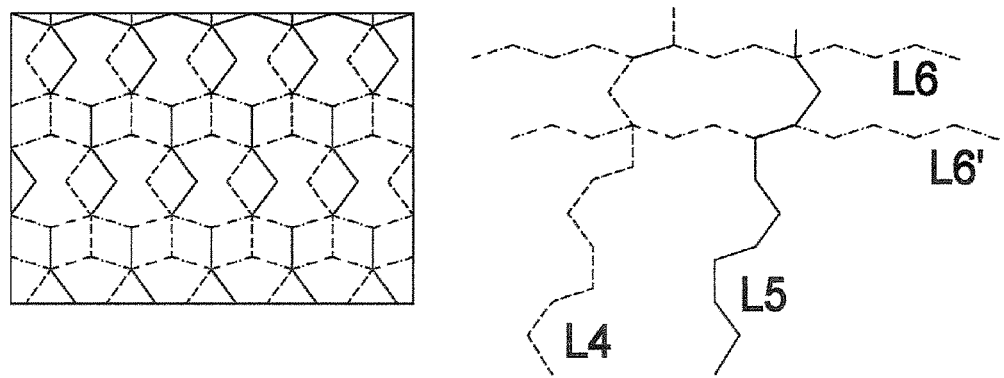
FIG. 16 shows the locus of groove base portions forming multidirectional elements of this invention.

FIG. 14, FIG. 15, and FIG. 16 are diagrams used to explain a method of forming multidirectional elements in a retroreflective article of this invention.

FIG. 14 shows only the locus of the base portions of grooves, the cross-section of which is a V-shape, which form pentagonal multidirectional elements shown in FIG. 4. The locus of these grooves forms a pattern in which continuous bent lines are repeated.

FIG. 15 shows, as L1, L2, and L3, the loci of grooves forming the outer-periphery base edges, among the loci of the V-shape grooves shown in FIG. 14. The angle of the V grooves of these three types of base portion loci are all the same angle.

FIG. 16 shows, as L4, L5 and L6, the loci of grooves forming common base edges, among the loci of the V-shape grooves shown in FIG. 14. The angle of the V grooves of these three types of base portion loci are all the same angle.

By forming these six types of V-grooves, a retroreflective article is formed, in which is formed an assembly of multidirectional elements having the pentagonal shape shown in FIG. 4.

Figure 17:
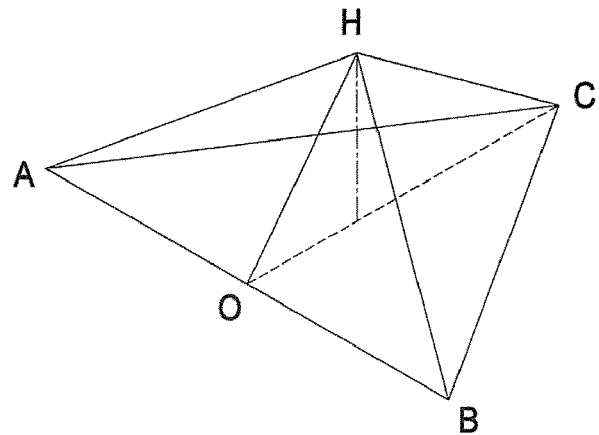
FIG. 17 is a cubic diagram used to explain reflecting elements in this invention.

Further, in order to impart observation angle characteristics to a multidirectional element in this invention, a slight deviation can be added to the prism apex angles. FIG. 17 shows a cubic diagram of a cube-corner element of the prior art, in which there is no deviation of the prism apex angles. Here, "prism apex angle" refers to the angles made by the three reflecting side faces (ABH, BCH, and CAH); in order to effect retroreflection, these three reflecting side faces must be mutually perpendicular. If a deviation is imparted to a prism apex angle, then retroreflective light no longer returns parallel to the incident light, so that the retroreflective light spreads while returning, and the observation angle characteristics are improved.

Figure 18:
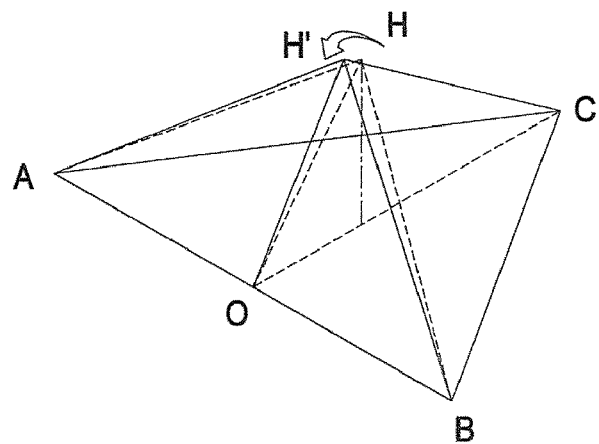
FIG. 18 is a cubic diagram used to explain reflecting elements in this invention.

FIG. 18 shows a conceptual diagram of a method for adding a deviation to a V-groove angle, which is one method of adding an apex angle deviation. In order to add a deviation to a V-groove angle, such methods can be adopted as adding a deviation in advance to the theoretical value of the knife-edge angle of a cutting tool, or inclining a cutting tool by a slight amount from the perpendicular to cut with an asymmetrical shape, or similar.

Figure 19:
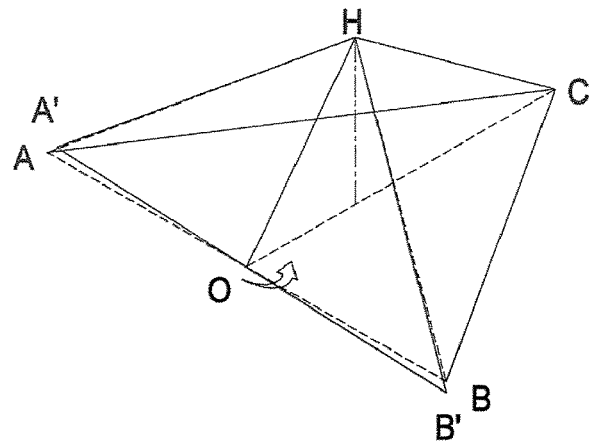
FIG. 19 is a cubic diagram used to explain reflecting elements in this invention.

FIG. 19 shows another method of adding an apex angle deviation. In this method, a deviation can be added by inclining the groove locus from its theoretical position, which is the line segment A-B.

Figure 20:
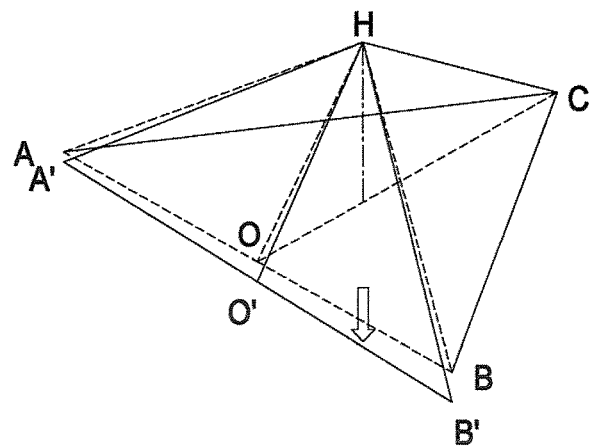
FIG. 20 is a cubic diagram used to explain reflecting elements in this invention.

FIG. 20 also shows another method of adding an apex angle deviation. In this method, by deeply cutting the groove loci within the face defined by the base edge group, that is, with respect to the reference face A-B-C, a deviation can be added.

Figure 21:
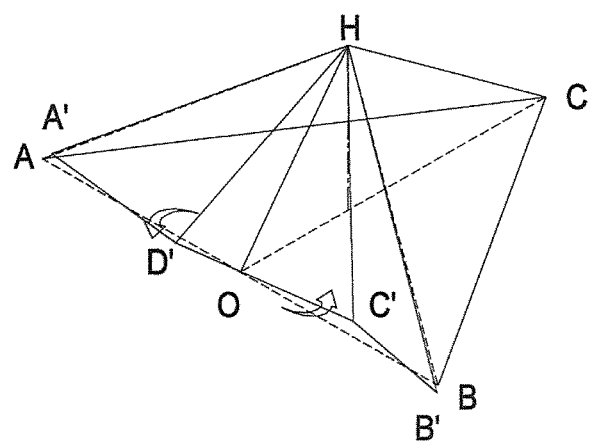
FIG. 21 is a cubic diagram used to explain reflecting elements in this invention.

FIG. 21 is a method of adding deviations to apex angles, by causing bending multiple times within the face in which the groove base portion loci are defined by the base edge group, that is, in the same plane as the reference face A-B-C, to add deviations. In this method, reflecting side faces are formed as numerous polyhedra, and uniform observation angle characteristics are attained, which is particularly preferable.

Figure 22:
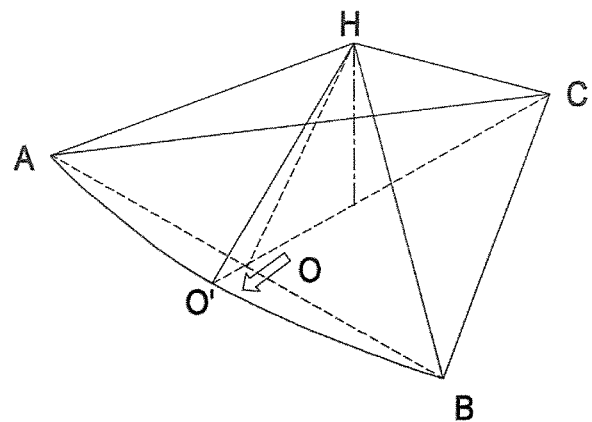
FIG. 22 is a cubic diagram used to explain reflecting elements in this invention.

Further, in FIG. 22, a method of adding apex angle deviation by taking groove loci to be curves is shown. In this method, the reflecting side faces are formed as curved surfaces, and uniform observation angle characteristics are attained, which is particularly preferable.

Methods of obtaining uniform observation angle characteristics based on the methods shown in FIG. 21 and FIG. 22 include, apart from methods in which changes are made within the reference face A-B-C defined by the base edge group, methods of changing the depth as shown in FIG. 19, to obtain similar advantageous results. When changing the groove depth, the depth may be deeper than, or shallower than, the reference face. Further, in changing the depth, groove loci may be bent, or changes may be made continuously over the curve loci.

EMBODIMENTS

Below, details of the invention are explained with greater specificity using embodiments; however, this invention is of course not limited to only these embodiments.

[Retroreflective Coefficient]

In the embodiments, and in this Specification, retroreflective coefficients are measured by the method described below. As a retroreflective coefficient measurement device, a Gamma Scientific "Model 920" was used, and measurements of the retroreflective coefficients of a retroreflective sheet 100 mm on a side were performed at five appropriate locations, conforming to the measurement method stipulated in ASTM E810-91, under angular conditions in which the observation angle ($\alpha$) was 0.2°, the entrance angle ($\beta$) was 5°, 30°, 40°, and 60°, and the rotation angle ($\omega$) ranged from 0 to 345° in 15° increments; the average value was taken to be the retroreflective coefficient for the retroreflective article.

[Method of Forming Retroreflective Article]

The retroreflective elements explained in the following embodiments and comparative examples were formed by directly cutting a commercially available colorless polymethyl methacrylate resin sheet, of thickness 200 μm, using a diamond bit having a prescribed angle.

Embodiment 1

In the element shown in FIG. 3, all of the five unit elements forming the multidirectional element are formed such that the length of the common base edges (A1-B, A2-B, and similar) is 247.60 μm, the length of the outer-periphery base edges (A1-A2, and similar) is 291.07 μm, and the height from the base face of the elements (A1-B-A2) to the vertex H1 of the unit element is 100 μm.

In order to form elements in this way, as the angles of the V-shape grooves to form each of the reflecting side faces, the angle of the V-shape grooves forming the reflecting side face A1-A2-H1 is 93.195°, and the angle of the V-shape groove forming the reflecting side face A1-B-H1 and the reflecting side face A2-B-H1 is 58.139°.

The inner angles of the triangular shape A1-A2-B of the element base face are 72.00° for ∠A1-B-A2, and 54.00° for ∠B-A1-A2 and for ∠B-A2-A1; the base edges A1-B, A2-B, and A1-A2 are all positioned within the same plane. As the reference direction for rotation, the direction to point A1 centered on the common vertex B was taken to be rotation angle 0°.

The five unit elements were formed such that the respective optical axes were inclined by 11.333° in the direction opposite the common vertex B, that is, in the direction of the outer-periphery base edge; the optical axes were all arranged equally to form azimuth angles of 72°.

Embodiment 2

In the element shown in FIG. 6, all of the eight unit elements forming the multidirectional element are formed such that the length of the common base edges (A1-B, A2-B, and similar) is 287.07 μm, the length of the outer-periphery base edges (A1-A2, and similar) is 219.75 μm, and the height from the base face of the elements (A1-B-A2) to the vertex H1 of the unit element is 100 μm.

In order to form elements in this way, as the angles of the V-shape grooves to form each of the reflecting side faces, the angle of the V-shape grooves forming the reflecting side face A1-A2-H1 is 48.949°, and the angle of the V-shape groove forming the reflecting side face A1-B-H1 and the reflecting side face A2-B-H1 is 80.117°.

The inner angles of the triangular shape A1-A2-B of the element base face are 45.00° for ∠A1-B-A2, and 67.50 for ∠B-A1-A2 and for ∠B-A2-A1; the base edges A1-B, A2-B, and A1-A2 are all positioned within the same plane. As the reference direction for rotation, the direction to point H1 centered on the common vertex B was taken to be rotation angle 0°.

The eight unit elements were formed such that the respective optical axes were inclined by 10.790° in the direction of the common vertex B, that is, in the direction opposite the outer-periphery base edge; the optical axes were all arranged equally to form azimuth angles of 45°.

Embodiment 3

In the element shown in FIG. 9, all of the five unit elements forming the multidirectional element are formed such that the length of the common base edges (A1-B, A2-B, and similar) is 247.60 μm, the length of the outer-periphery base edges (A1-A2, and similar) is 291.07 μm, and the height from the base face of the elements (A1-B-A2) to the vertex H1 of the unit element is 100 μm.

In order to form elements in this way, as the angles of the V-shape grooves to form each of the reflecting side faces, the angle of the V-shape grooves forming the reflecting side face A1-A2-H1 is 93.195°, and the angle of the V-shape groove forming the reflecting side face A1-B-H1 and the reflecting side face A2-B-H1 is 58.139°. However, for the reflecting side face A1-A2-H1, the V-shape groove is formed to be 20 μm shallower than in Embodiment 1.

The inner angles of the triangular shape A1-A2-B of the element base face are 72.00° for ∠A1-B-A2, and 54.00° for ∠B-A1-A2 and for ∠B-A2-A1; the base edges A1-B and A2-B are all positioned within the same plane. As the reference direction for rotation, the direction to point A1 centered on the common vertex B was taken to be rotation angle 0°.

The five unit elements were formed such that the respective optical axes were inclined by 11.333° in the direction opposite the common vertex B, that is, in the direction of the outer-periphery base edge; the optical axes were all arranged equally to form azimuth angles of 72°.

Embodiment 4

In the element shown in FIG. 11, all of the eight unit elements forming the multidirectional element are formed such that the projected length of the edges of the triangle defining the element outer periphery (A1-B, A2-B, and similar) is 287.07 μm, the lengths of the outer-periphery base edges (A1-A2 and similar) is 219.75 μm, and the height from the element reference base face (C1-B-C2) to the unit element vertex H1 is 100 μm.

In order to form elements in this way, as the angles of the V-shape grooves to form the reflecting side faces, the angle of the V-shape grooves forming the reflecting side face A1-A2-H is 48.949°, and the angle of the V-shape groove forming the reflecting side face C1-B-H1 and the reflecting side face C2-B-H1 is 80.117°.

However, for the reflecting side face A1-A2-H1, the V-shape groove is formed to be 40 μm deeper than in Embodiment 2. That is, at the three base edges of the triangular base face of a unit element, if the depth of the V-shape groove forming the shortest base edge A1-A2 is ds, and the depth of the V-shape grooves forming the longest edges (B-C1 and B-C2) is de, then ds/de=1.40.

The inner angles of the projected triangle A1-A2-B defining the outer periphery of the element are 45.00° for ∠C1-B-C2, and 67.5° for ∠B-A1-A2 and for ∠B-A2-A1; the base edges C1-B, C2-B are all positioned within the same plane. As the reference direction for rotation, the direction to vertex H1 centered on the common vertex B was taken to be rotation angle 0°.

The eight unit elements were formed such that the respective optical axes were inclined by 10.790° in the direction of the common vertex B, that is, in the direction opposite the outer-periphery base edge; the optical axes were all arranged equally to form azimuth angles of 45°.

Embodiment 5

As shown in FIG. 12, a multidirectional element was formed from 12 unit elements. The 12 unit elements all were formed to have a shape such that the projected length of the edges of the triangular defining the outer periphery of the element (A1-B, A2-B, and similar) were 401.03 μm, the length of the outer-periphery base edges (A1-A2 and similar) was 207.59 μm, and the height from the element reference base face (C1-B-C2) to the unit element vertex H1 was 100 μm.

The angle of the V-shape grooves to form each of the reflecting side faces in order to form such an element are 31.085° for the angle of the V-shape groove forming the reflecting side face A1-A2-H1, and 85.883° for the angle of the V-shape grooves to form the reflecting side faces C1-B-H1 and C2-B-H1.

However, the reflecting side face A1-A2-H1 is formed to be 200 μm deeper than the V-shape groove in Embodiment 2. That is, in three of the base edges of the triangular base face of a unit element, if the depth of the V-shape groove forming the shortest base edge A1-A2 is ds, and the depth of the V-shape grooves forming the longest base edges (B-C1 and B-C2) is de, then ds/de=3.0.

The inner angles of the projected triangular shape A1-A2-B defining the outer periphery of the element are 30.00° for ∠C1-B-C2, and 75° for ∠B-A1-A2 and for ∠B-A2-A1; the base edges C1-B and C2-B are positioned within the same plane. As the reference direction for rotation, the direction to point H1 centered on the common vertex B was taken to be rotation angle 0°.

The 12 unit elements were formed such that the respective optical axes were inclined by 19.72° in the direction of the common vertex B, that is, in the direction opposite the outer-periphery base edge; the optical axes were all arranged equally to form azimuth angles of 30°.

Embodiment 6

In Embodiment 6, when forming a multidirectional element comprising the eight unit elements fabricated in Embodiment 2, while forming V-shape grooves, cutting of V-shape grooves was performed such that the locus of groove base portions was curved shapes, according to the method shown in FIG. 22.

As the curve shapes, sinusoidal curve approximations were used, based on the straight-line loci of base edges of the element in Embodiment 2. The amplitude of the sinusoidal curves was 0.005 of the length of each edge (A1-B, A2-B, A1-A2, and similar). Hence because the length of edges A1-B and A2-B in Embodiment 2 is 287.07 μm, the amplitude is 1.44 μm, and because edge A1-A2 has length 219.75 μm, the amplitude is 1.10 μm.

Further, the period of the sinusoidal curves was taken to be four times the edge length. Hence because edges A1-B and A2-B in Embodiment 2 have length 287.07 μm, the period is 1148.27 μm, and because edge A1-A2 has length 219.75 μm, the period is 879.98 μm. In addition, the positions at which the amplitude is a maximum value and is zero were adjusted so as to be at end portions of each edge.

In addition, Comparative Examples, based on well-known technology of the prior art, are explained for the purpose of comparison with retroreflective articles of this invention.

Comparative Example 1

A pair of triangular-pyramidal cube-corner retroreflective elements, mutually opposed and with one base edge in common as shown in FIG. 1, was used as a retroreflective article in a comparative example. The elements are formed such that the length of the common base edge (A-B) was 291.07 μm, the length of the other two edges (A-C and B-C) was 247.60 μm, and the height from the element reference base face (A-B-C) to the vertex H of the unit elements is 100 μm.

In order to form such an element, the angle of the V-shape grooves to form the reflecting side faces were 93.195° for the V-shape groove forming the reflecting side face A-B-H, and 58.139° for the V-shape grooves forming the reflecting side faces A-C-H and B-C-H.

The inner angles of the triangular shape A-B-C of the element base face are 72.00° for ∠A-C-B, and 54.00° for ∠B-A-C and for ∠A-B-C; the base edges A-B, C-B, and B-C are all positioned within the same plane. That is, the retroreflective elements in Comparative Example 1 have the same shape as the unit elements used in Embodiment 1. As the reference direction for rotation, the direction to point C centered on the center point of the common base edge A-B was taken to be rotation angle 0°.

The two reflecting elements are formed such that the optical axes of the two reflecting elements are inclined 11.333° in the direction of the common base edge A-B, and such that the two optical axes have azimuth angles at 180° to each other. A retroreflective article in which such triangular-pyramidal retroreflective element pairs are formed in closest-packed fashion was taken to be Comparative Example 1.

Comparative Example 2

A pair of triangular-pyramidal cube-corner retroreflective elements, mutually opposed and with one base edge in common as shown in FIG. 1, was used as a retroreflective article in a comparative example. The elements are formed such that the length of the common base edge (A-B) was 219.75 μm, the length of the other two edges (A-C and B-C) was 287.07 μm, and the height from the element reference base face (A-B-C) to the vertex H of the unit elements is 100 μm.

In order to form such an element, the angle of the V-shape grooves to form the reflecting side faces were 48.949° for the V-shape groove forming the reflecting side face A-B-H, and 80.117° for the V-shape grooves forming the reflecting side faces A-C-H and B-C-H.

The inner angles of the triangular shape A-B-C of the element base face are 45.00° for ∠A-C-B, and 67.50° for ∠B-A-C and for ∠A-B-C; the base edges A-B, C-B, and B-C are all positioned within the same plane. That is, the retroreflective elements in Comparative Example 2 have the same shape as the unit elements used in Embodiment 2. As the reference direction for rotation, the direction to point C centered on the center point of the common base edge A-B was taken to be rotation angle 0°.

The two reflecting elements are formed such that the optical axes of the two reflecting elements are inclined 10.79° in the direction opposite the common base edge A-B, and such that the two optical axes have azimuth angles at 180° to each other. A retroreflective article in which such triangular-pyramidal retroreflective element pairs are formed in closest-packed fashion was taken to be Comparative Example 2.

Comparative Example 3

A pair of triangular-pyramidal cube-corner retroreflective elements, mutually opposed and with one base edge in common as shown in FIG. 1, was used as a retroreflective article in a comparative example. The elements are formed such that the length of the common base edge (A-B) was 274.65 μm, the length of the other two edges (A-C and B-C) was 242.91 μm, and the height from the element reference base face (A-B-C) to the vertex H of the unit elements is 100 μm.

In order to form such an element, the angle of the V-shape grooves to form the reflecting side faces were 86.529° for the V-shape groove forming the reflecting side face A-B-H, and 61.983° for the V-shape grooves forming the reflecting side faces A-C-H and B-C-H.

The inner angles of the triangular shape A-B-C of the element base face are 68.851° for ∠A-C-B, and 55.575° for ∠B-A-C and for ∠A-B-C; the base edges A-B, C-B, and B-C are all positioned within the same plane. That is, the retroreflective elements in Comparative Example 1 have the same shape as the unit elements used in Embodiment 1. As the reference direction for rotation, the direction to point C centered on the center point of the common base edge A-B was taken to be rotation angle 0°.

The two reflecting elements are formed such that the optical axes of the two reflecting elements are inclined 8.00° in the direction of the common base edge A-B, and such that the two optical axes have azimuth angles at 180° to each other.

In Comparative Example 3, a retroreflective article was formed by combining element pairs such as those above with the optical axes inclined 8° in two zones, with element rotation directions at 0° and 90°, as shown in FIG. 2, as Comparative Example 3.

As a retroreflective coefficient measurement device, a Gamma Scientific "Model 920" was used in measurements, at five appropriate locations, of the retroreflective coefficients of retroreflective sheets 100 mm on a side which were the objects of Embodiments 1 through 4 and Comparative Examples 1 through 3, conforming to the measurement method stipulated in ASTM E810-91, under angular conditions in which the observation angle (α) was 0.2°, the entrance angle (β) was 5°, 30°, 40°, and 60°, and the rotation angle (ω) ranged from 0 to 345° in 15° increments; the average value was taken to be the retroreflective coefficient for the retroreflective articles, as shown in the radar charts of FIG. 22 through FIG. 28.

In the radar charts of FIG. 22 through FIG. 28, the retroreflective coefficients for entrance angles (β) of 5°, 30°, 40°, and 60° are plotted, on a logarithmic scale in the clockwise direction on the radar charts, varying the element rotation angle from 0 to 345° in 15° increments.

In the Comparative Examples 1 through 3 based on well-known technology of the prior art, the rotation angle dependence of the retroreflective coefficients with increasing entrance angle is prominent. This rotation angle dependence has been extremely inconvenient when observing the retroreflective article from different azimuth angles, as in the case of traffic signs and similar.

Figure 26:
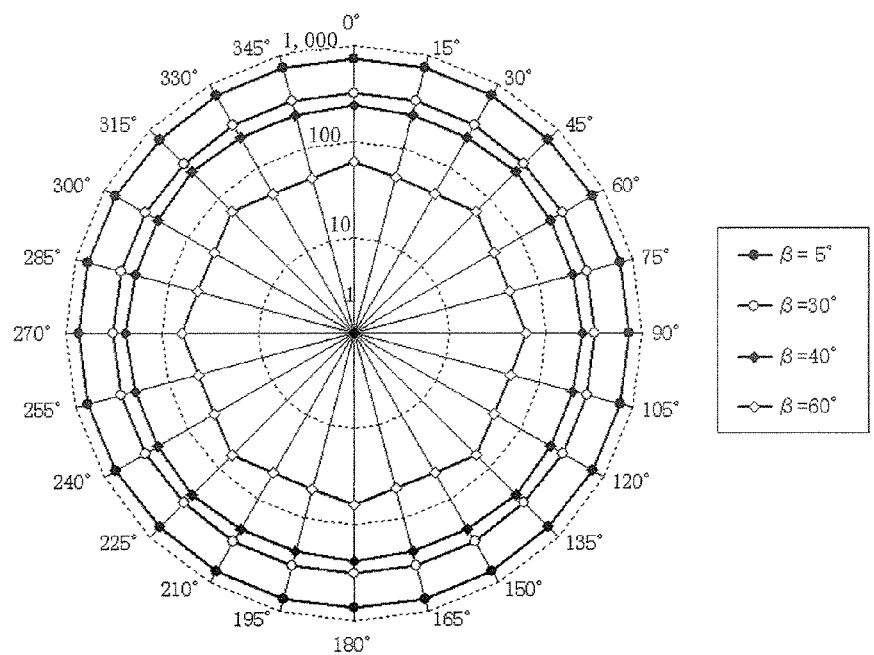
FIG. 26 is a radar chart of retroreflective coefficients of the retroreflective article in Embodiment 4 of the invention.

In Comparative Example 1, the difference in retroreflective performance is especially prominent for rotation angles of 0° and 90°, and FIG. 26 shows that the difference in retroreflective coefficients between rotation angles of 0° and 90° at an entrance angle of 60° is a factor of 80 or more, and that the difference in reflection performance is a factor of 1.5 or more at an entrance angle of 40° as well.

Figure 27:
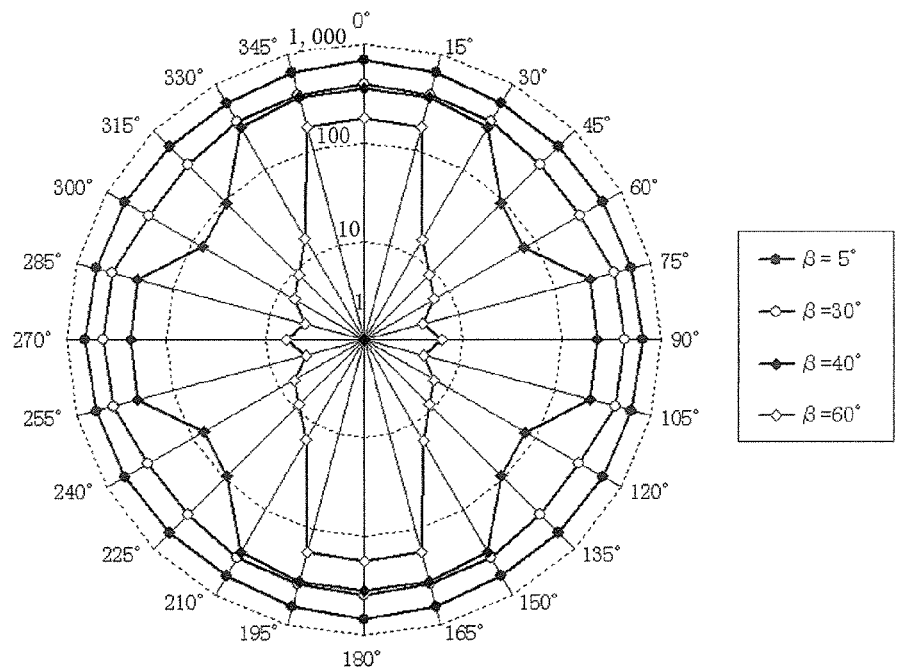
FIG. 27 is a radar chart of retroreflective coefficients of the retroreflective article in Comparative Example 1 of the invention.
Figure 28:
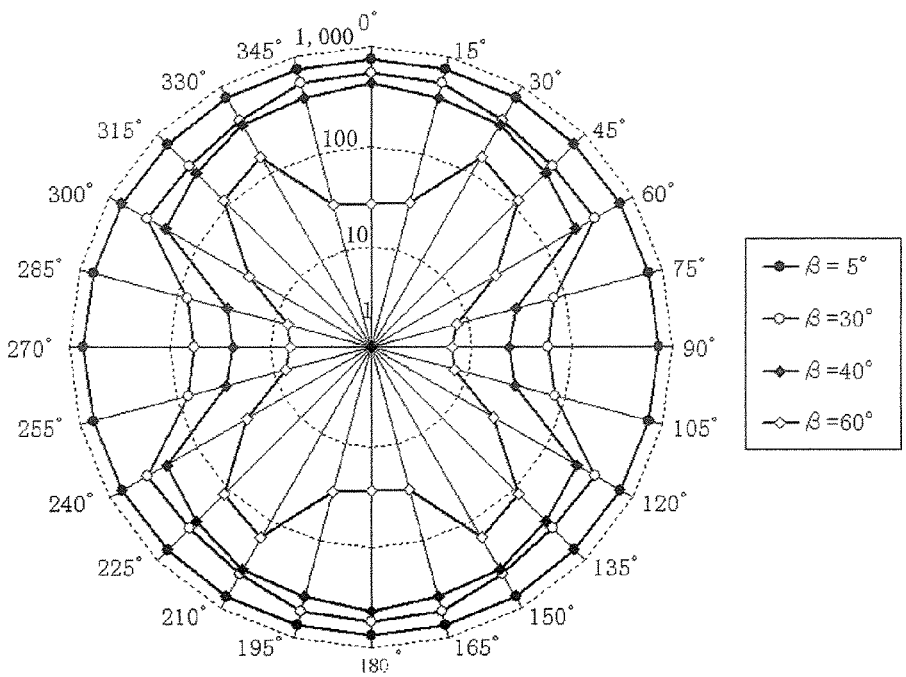
FIG. 28 is a radar chart of retroreflective coefficients of the retroreflective article in Comparative Example 2 of the invention; and, FIG. 29 is a radar chart of retroreflective coefficients of the retroreflective article in Comparative Example 3 of the invention.
Figure 29:
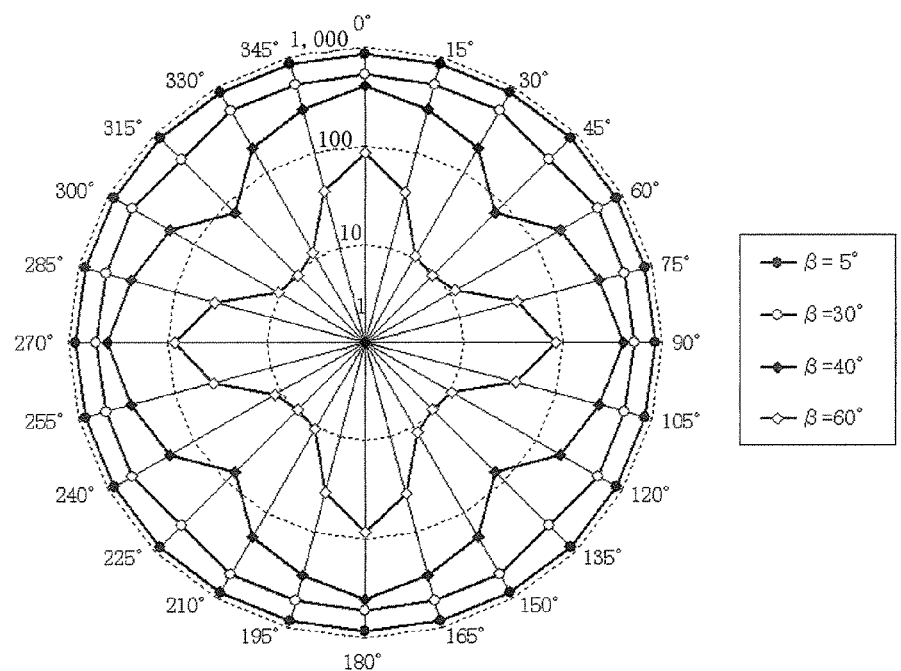

In Comparative Example 2 also, this tendency remains the same, and as shown in FIG. 27, the rotation angle dependence is prominent. A difference with Comparative Example 1 is the fact that for the retroreflective article of Comparative Example 2, an increased retroreflective performance is seen for rotation angles of 30 to 45°, 135 to 150°, 210 to 225°, and 315 to 330°.

Because the design of elements in Comparative Example 3 is divided between azimuth angles of 0° and 90°, the retroreflective performance can be made equal for 0° and 90°, but the decline in retroreflective performance at 45° remains pronounced, and such a retroreflective article is not preferable for use in traffic signs.

Figure 23:
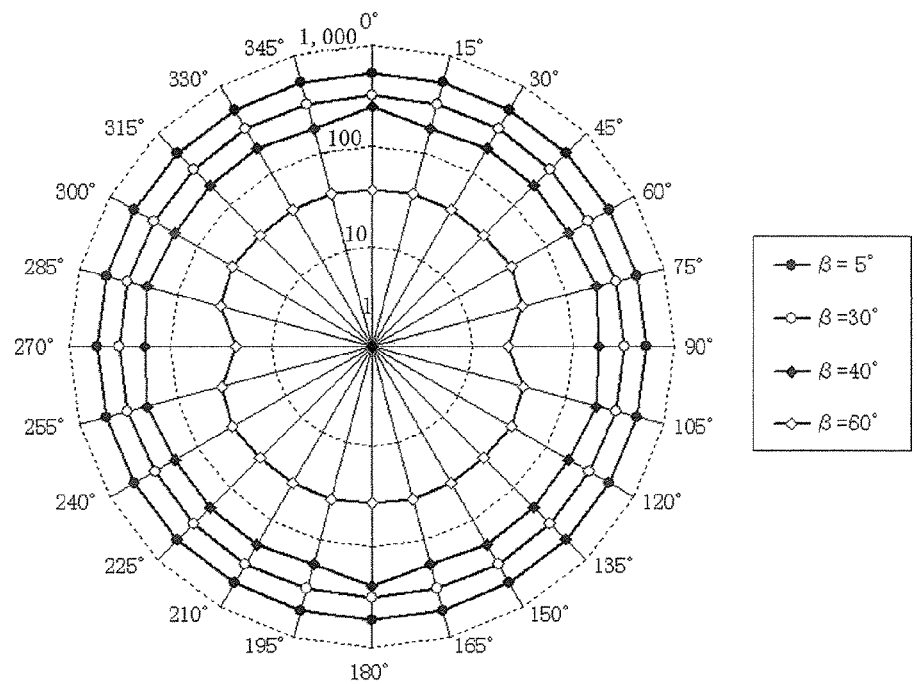
FIG. 23 is a radar chart of retroreflective coefficients of the retroreflective article in Embodiment 1 of the invention.

As shown in FIG. 22 and FIG. 23, the rotation angle dependence of the retroreflective articles in Embodiment 1 and Embodiment 2, compared with the retroreflective articles of the prior art as described in Comparative Examples 1 through 3, clearly have smaller rotation angle dependences at all entrance angles.

Figure 24:
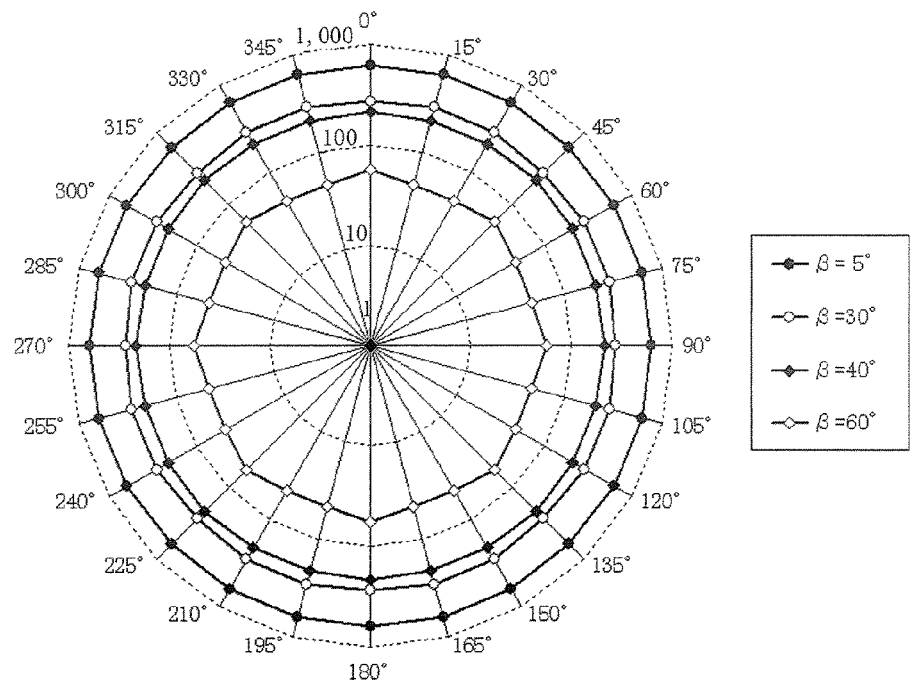
FIG. 24 is a radar chart of retroreflective coefficients of the retroreflective article in Embodiment 2 of the invention.
Figure 25:
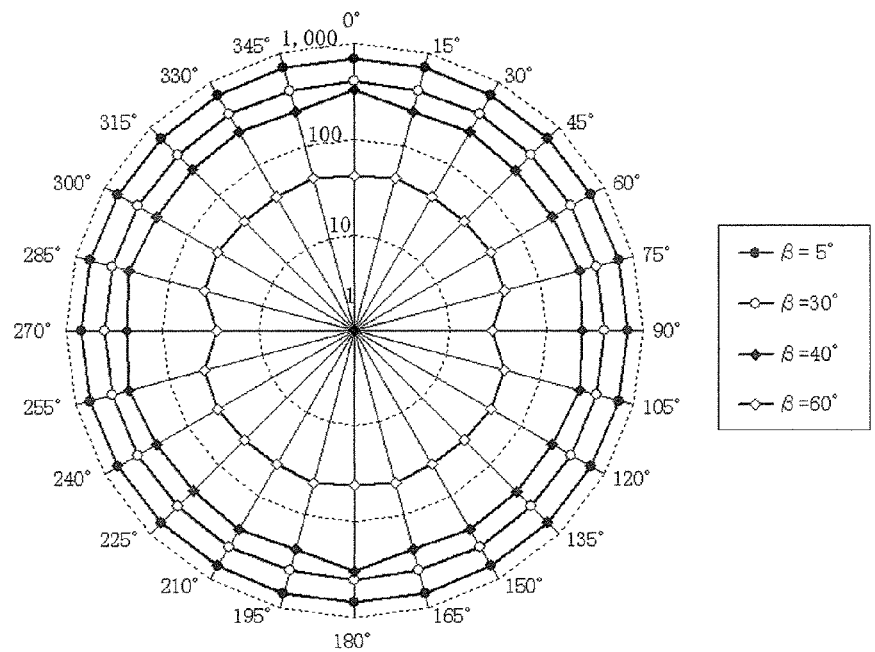
FIG. 25 is a radar chart of retroreflective coefficients of the retroreflective article in Embodiment 3 of the invention.

Further, as shown in FIG. 24 and FIG. 25, the rotation angle dependence of the retroreflective articles in Embodiment 3 and Embodiment 4 is clearly small at all entrance angles, compared with the well-known retroreflective articles of the prior art described in Comparative Examples 1 through 3. Similarly advantageous results have been confirmed for the retroreflective article of Embodiment 5.

Also, in Embodiment 3, the reflecting side face A1-A2-H1 is formed to be 20 μm shallower than the V-shape groove in Embodiment 1, and in Embodiment 4 the reflecting side face A1-A2-H1 is formed to be 40 μm deeper than the V-shape groove in Embodiment 2, so that the retroreflective efficiency is enhanced, and improved retroreflective coefficients result.

Further, in Embodiment 5, the reflecting side face A1-A2-H1 is formed to be 200 μm deep, so that the retroreflective efficiency is enhanced, and an improved retroreflective coefficient results.

Upon comparing observation angle characteristics for the retroreflective articles of Embodiments 2 and 6, at an entrance angle of 5° and observation angles of 0.2°, 0.33°, and 1.0°, superior observation angle characteristics were obtained for the retroreflective article of Embodiment 6 at all rotation angles compared with the retroreflective article of Embodiment 2, as indicated by Table 1 below.

That is, it was confirmed that retroreflected rays in the forward direction of the retroreflective article of Embodiment 2, that is, at an observation angle of 0.2°, were broadened to the directions of larger observation angles through formation of grooves in curve shapes.

TABLE 1

|  | Observation angle | | |
| --- | --- | --- | --- |
|  | 0.2° | 0.33° | 1.0° |
| Embodiment 2 | 790 | 567 | 46 |
| Embodiment 6 | 528 | 634 | 90 |

INDUSTRIAL APPLICABILITY

Specific applications for retroreflective articles of this invention include retroreflective articles and retroreflective sheets which can be used in traffic signs, construction signs, commercial signs, vehicle license plates, and similar, and sheets which can be cut freely in any direction and utilized due to excellent rotation angle characteristics.

The invention claimed is:

1. A triangular-pyramidal cube-corner retroreflective sheet, comprising numerous triangular-pyramidal cube-corner light-transparent retroreflective elements formed by cutting away a group of grooves having a substantially V-shape cross-section, characterized in that an assembly of retroreflective multidirectional elements is formed, in which either five, or seven or more triangular-pyramidal cube-corner retroreflective unit elements are formed so as to share two common base edges forming triangular base faces of the unit elements as well as common vertexes at which the common base edges intersect, with an adjacent retroreflective element.

2. The triangular-pyramidal cube-corner retroreflective article according to claim 1, wherein the multidirectional element is formed from five, or seven to twelve unit elements.

3. The triangular-pyramidal cube-corner retroreflective article according to claim 1 or claim 2, wherein lengths of two common base edges forming the unit elements are equal.

4. The triangular-pyramidal cube-corner retroreflective article according to claim 3, wherein the multidirectional element is formed such that the locus of a base portion defined by the intersection of two side faces of a groove having a substantially symmetrical V-shape cross-section forms straight lines, bent lines, curves or repeated line groups comprising a combination of these line groups.

5. The triangular-pyramidal cube-corner retroreflective article according to claim 4, wherein repeated line groups forming the locus of the base portion are in a common plane defined by the triangular base faces of the unit elements.

6. The triangular-pyramidal cube-corner retroreflective article according to claim 4, wherein at least one line group among the repeated line groups is not in the common plane defined by the triangular base faces of the unit elements.

7. The triangular-pyramidal cube-corner retroreflective article according to claim 4, wherein at least one line group among the repeated line groups is not in the common plane, and that a depth of the V-shape groove, determined by a distance between a plane defined by the line group and a vertex of the unit element, is ±(5 to 200) % of an element height, defined by a distance between the vertex of the unit element and in the common plane defined by the triangular base faces of the unit elements.

8. The triangular-pyramidal cube-corner retroreflective article according to claim 6, wherein the radius of curvature of bending portions of the bent line-shaped locus of the base portion is from 2 to 50 μm.

9. The triangular-pyramidal cube-corner retroreflective article according to claim 6, wherein the line groups forming the locus of the base portion are curve groups defined by trigonometric functions, inverse trigonometric functions, elliptic functions, circular functions, and composite functions of these functions.

10. The triangular-pyramidal cube-corner retroreflective article according to claim 6, wherein in the three base edges of the triangular base face of the unit element, when a depth of the V-shape groove forming the shortest base edge is assumed as ds and a depth of the V-shape groove forming the longest base edge is assumed as de, an inequality $1.05 \leq (ds/de) \leq 3.00$ (1) is satisfied.

11. The triangular-pyramidal cube-corner retroreflective article according to claim 6, wherein the multidirectional elements are formed comprising at least one type of unit element having a prism side face in which at least one prism apex angle among three prism apex angles formed by three reflecting side faces forming the unit element and perpendicular to one another has a deviation from perpendicular of from 0.0001 to 0.01°.

12. The triangular-pyramidal cube-corner retroreflective article according to claim 11, wherein the multidirectional elements are formed comprising at least three types of unit elements having a prism side face in which at least one prism apex angle among three prism apex angles formed by three reflecting side faces forming the unit element and perpendicular to one another has a deviation from perpendicular of from 0.0001 to 0.01°.

13. The triangular-pyramidal cube-corner retroreflective article according to claim 11, wherein at least one reflecting side face of the three retroreflective side faces of the unit element forms a curved surface, and that the maximum deviation of the curved surface with a virtual plane forming the unit element all reflecting side faces of which are planar is from $1/1000$ to $200/1000$ of the length of the base portion forming the curved surface.

14. The triangular-pyramidal cube-corner retroreflective article according to claim 13, wherein V-shape grooves forming common base edges are cut by means of one or more V-shape subgrooves, parallel to the V-shape grooves forming base edges of unit elements forming the outer periphery of the multidirectional element (hereafter called "outer-periphery base edges"), and having an angle substantially equal to the angle of the V-shape grooves, and in that unit reflective elements are formed by a square-shape cube-corner retroreflective element with at least one base face and by one triangular-pyramidal cube-corner retroreflective element.

15. The triangular-pyramidal cube-corner retroreflective article according to claim 14, wherein the height of the unit elements is from 25 to 2000 μm.

* * * * *